United States Patent
Cai

(10) Patent No.: US 11,154,035 B2
(45) Date of Patent: Oct. 26, 2021

(54) PET DRINKING BOWL COMPONENT

(71) Applicant: Taizhou Huangyan Pianpian Pet Products Factory, Zhejiang (CN)

(72) Inventor: Bin Cai, Taizhou (CN)

(73) Assignee: Taizhou Huangyan Pianpian Pet Products Factory (General Partnership), Zhejiang (CN)

( * ) Notice: Subject to any disclaimer, the term of this patent is extended or adjusted under 35 U.S.C. 154(b) by 124 days.

(21) Appl. No.: 16/663,326

(22) Filed: Oct. 24, 2019

(65) Prior Publication Data
US 2020/0053981 A1 Feb. 20, 2020

Related U.S. Application Data

(63) Continuation of application No. PCT/CN2017/093857, filed on Jul. 21, 2017.

(51) Int. Cl.
- *A01K 7/06* (2006.01)
- *A01K 7/00* (2006.01)
- *B23B 5/06* (2006.01)

(52) U.S. Cl.
CPC ............. *A01K 7/06* (2013.01); *A01K 7/005* (2013.01); *B23B 5/06* (2013.01)

(58) Field of Classification Search
CPC .. A01K 7/02; A01K 7/06; F16K 1/465; F16K 1/42; F16K 1/46
USPC .......... 222/544, 490–497, 505–510; 251/359
See application file for complete search history.

(56) References Cited

U.S. PATENT DOCUMENTS

| | | | | |
|---|---|---|---|---|
| 3,066,832 A | * | 12/1962 | Rossetti | A47K 5/1215 222/207 |
| 3,179,300 A | * | 4/1965 | Davidson | B65D 47/2075 222/213 |
| 3,529,575 A | * | 9/1970 | Thomasg | A01K 1/0356 119/72.5 |
| 3,771,496 A | * | 11/1973 | Atchley | A01K 7/06 119/72.5 |
| 3,838,664 A | * | 10/1974 | Atchley | A01K 39/0213 119/72.5 |
| 4,393,813 A | * | 7/1983 | Sou | A01K 7/06 119/72.5 |
| 5,549,074 A | * | 8/1996 | Hui | A01K 1/0356 119/464 |

(Continued)

FOREIGN PATENT DOCUMENTS

| | | |
|---|---|---|
| CN | 2571164 | 9/2003 |
| CN | 2653874 | 11/2004 |

*Primary Examiner* — Brady W Frazier
*Assistant Examiner* — Zoe Tam Tran
(74) *Attorney, Agent, or Firm* — JCIP Global Inc.

(57) ABSTRACT

A pet drinking bowl component includes a steel pipe, a copper head inlayed at one end of the steel pipe, a seal ring arranged in the copper head, and a steel ball moving in the steel pipe and blocked by the seal ring. The end of the steel pipe is provided with a groove-inlaying part. A ring-inlaying part is arranged at an end of the copper head. The groove-inlaying part and the ring-inlaying part are spliced through glue. A seal ring mounting part is arranged on the copper head. And inner diameter of the seal ring mounting part is reduced along a water outlet direction. An outer wall of the seal ring is adhered to the mounting part. The seal ring mounting part is close to half a height of the steel ball.

4 Claims, 6 Drawing Sheets

(56) References Cited

U.S. PATENT DOCUMENTS

| | | | | |
|---|---|---|---|---|
| 5,816,194 | A  * | 10/1998 | Huff | A01K 7/06 |
| | | | | 119/72.5 |
| 5,934,222 | A  * | 8/1999 | Hwang | A01K 7/06 |
| | | | | 119/72 |
| 6,553,937 | B1 | 4/2003 | Cheng | |
| 6,561,129 | B1 * | 5/2003 | Cheng | A01K 1/0356 |
| | | | | 119/72 |
| 6,588,368 | B1 * | 7/2003 | Cheng | A01K 7/06 |
| | | | | 119/51.03 |
| 6,640,748 | B1 * | 11/2003 | Cheng | A01K 7/06 |
| | | | | 119/72 |
| 6,810,830 | B1 * | 11/2004 | Cheng | A01K 7/06 |
| | | | | 119/72.5 |
| 8,464,660 | B2 * | 6/2013 | Valeriano | A01K 39/0213 |
| | | | | 119/72 |
| 2005/0199654 | A1 * | 9/2005 | Andersen | B05B 11/0062 |
| | | | | 222/190 |
| 2007/0079762 | A1 * | 4/2007 | Stephanos | A01K 7/00 |
| | | | | 119/74 |
| 2008/0196670 | A1 * | 8/2008 | Clark | A01K 7/06 |
| | | | | 119/73 |
| 2010/0032454 | A1 * | 2/2010 | Moribata | A45D 40/0075 |
| | | | | 222/494 |
| 2011/0163883 | A1 * | 7/2011 | Ho | A01K 7/06 |
| | | | | 340/615 |
| 2014/0239215 | A1 * | 8/2014 | Cardaropoli | A01K 39/0213 |
| | | | | 251/319 |

* cited by examiner

PET DRINKING BOWL COMPONENT

CROSS-REFERENCE TO RELATED APPLICATION

This application is a continuation of international PCT application serial no. PCT/CN2017/093857 filed on Jul. 21, 2017. The entirety of the above-mentioned patent application is hereby incorporated by reference herein and made a part of this specification.

BACKGROUND

Technical Field

The invention relates to a pet drinking bowl component, in particular to a pet drinking bowl component and a processing method thereof.

DESCRIPTION OF RELATED ART

The existing pet drinking bowl comprises a drinking bottle, wherein the drinking bottle is connected with a bottle cap, the bottle cap is connected with a water outlet pipe, a steel ball is arranged in a pipe opening of the water outlet pipe, the steel ball is sealed with the pipe opening, when the pet drinking bowl is used, the bottle opening of the drinking bottle is downwards, the drinking bowl is hung on a bracket of a pet cage reversely through a fixing mechanism. When the pet is drinking water, the steel ball is licked by the tongue of a pet, the steel ball is separated from the sealed pipe opening, and water flows out from the pipe opening of the water outlet pipe for the pet to drink.

At present, the diameter of the water outlet pipe is distinguished according to the body shape of the pet, the outer diameter of the water outlet pipe of the existing small pet drinking bowl such as a rabbit, a hamster and the like is within 10 mm, and the outer diameter of the water outlet pipe of the large pet drinking bowl of the cat dog is 12-16 mm.

For large pets such as cats and dogs, the water outlet pipe used in the market at present comprises a plastic pipe which is communicated with a bottle cap and is integrally manufactured, a copper head which is formed by turning is adopted, the copper head is fixed on the plastic pipe, a seal ring and a steel ball are arranged inside the copper head, a wall thickness of the copper head is required to achieve the stability of the strength of the copper head, the wall thickness of the existing water outlet pipe in the market is large, the cost of metal materials is increased, but the wall thickness is reduced. There is a possibility for the pet to bite the end of the water outlet pipe with its teeth in the drinking process, so that the end of the water outlet pipe is deformed.

The structural strength of the plastic pipe part is far lower than that of the copper head, and due to the limitation of turning, only the copper head with a small diameter of at most about 3.5 cm can be machined at present, so that the plastic pipe part, especially the position where the plastic pipe is connected with the copper head is easy to be broken by biting in the use process, where the strength is the weakest in the water outlet pipe, and the plastic pipe part is easy to break in the use process. In particular, canines have the habit of molars, so that the service life of the water outlet pipe is very short, and health problems easily occur after the pet eats the plastic during the tearing and biting process.

The small pets such as rabbits, hamsters and the like belong to rodents, and the small pets have a habit of often actively biting the plastic pipe, so that the plastic pipe is easy to damage, the service life of the water outlet pipe is very short, and health problems are easy to occur after the pets eat the plastic in the biting process.

In addition, for the current pet drinking bowl, there is a technical problem of sealing performance that is difficult to be solved. Although most products on the market have preliminarily solved the problem of water leakage to the outlet pipe of the drinking bowl, the effect is still not ideal. An O-shaped seal ring is usually adopted in the existing product, so that the surface of the steel ball is adhered to the O-shaped seal ring through the weight of the steel ball to achieve a sealing effect. Therefore, it is particularly important to match the steel ball with the seal ring, and an improper design can result in difficulty for the pets to drink water or water leakage.

If the weight of the steel ball for sealing is increased or the spring is arranged to push the steel ball to extrude the seal ring in order to improve the sealing effect in the current market, the extrusion force of the steel ball on the seal ring is too large, although the sealing effect is improved, the steel ball is not easy to be licked by pets in the process of drinking water, so that it is difficult for the pets to drink water, even the tongue fur of pets is damaged, and when the pressure applied is too small, the sealing performance is easily reduced, and water leakage occurs.

SUMMARY

Aiming at the defects in the prior art, the invention aims to provide a pet drinking bowl component and a processing method thereof, which have the advantages of lower cost, higher structural strength and high sealing reliability.

The technical purpose of the invention is achieved through the following technical scheme.

A method of processing a pet drinking bowl component comprises the following steps.

S1, cutting off a steel pipe, machining an end face of each segment of the steel pipe by using a lathe to keep smoothness, machining one end of the steel pipe by using the lathe to form a groove-inlaying part, cutting off a copper head, machining one end of the copper head by using the lathe to form a ring-inlaying part, and machining an inner wall of the copper head to form a seal ring mounting part, and chamfering the other end of the copper head.

S2, coating glue on the groove-inlaying part or the ring-inlaying part, splicing the groove-inlaying part and the ring-inlaying part, pressing by a press machine, and cooling to form a water outlet pipe body.

S3, electroplating the water outlet pipe body.

S4, mounting a seal ring on the inner wall of the copper head by using a clamp, and throwing a steel ball into the end of the steel pipe.

With the arrangement, since the copper head has ensured the stability and firmness of the end structure, the steel pipe is adopted to reduce the wall thickness, the steel pipe with lower wall thickness is beneficial to saving materials, and the smoothness of an inner wall of the steel pipe is high. The copper head is inlaid, and the technology of inlaying the copper head is carried out by processing the two components to form a groove-inlaying part and a ring-inlaying part. Then, the water outlet pipe body is formed by splicing using glue and an interference fit mode, then the water outlet pipe body is electroplated, so that the corrosion resistance and the surface smoothness of the water outlet pipe body are improved, and then a seal ring is placed, so that the seal ring is inlayed on the mounting part of the water outlet pipe body.

The size and the gravity of the steel ball ensure that the steel ball can press the seal ring to seal when the amount of water stored in the drinking bottle is small, wherein the seal ring is deformed by the gravity of the steel ball so as to be more adhered to the surface of the steel ball, so that the sealing effect is achieved. In addition, when the pet licks the steel ball with its tongue, the steel ball is rolled, so that a clearance is formed between the surface of the seal ring and the surface of the steel ball, and water leakage occurs. To sum up, the cost for the material is obviously reduced, the structural strength is guaranteed by the inlayed copper head, and the copper head is not easy to deform even the pets bite it. The sealing reliability is achieved by the arrangement position of the seal ring, the seal ring is arranged on the inner wall of the copper head, the seal ring and the copper head are partially exposed by the steel ball, the seal ring is extruded by the steel ball due to gravity, so that the contact area is enlarged, and the sealing effect is improved by gravity. When the steel ball rolls, gravity is reduced, and clearances are formed between the seal ring and the steel ball, so that it is easier for the pets to drink water.

As a specific embodiment of the present invention, it may be preferable that, in the step S1, the seal ring mounting part is machined, an inner diameter of the seal ring mounting part is gradually reduced along a water outlet direction, an outer wall of the seal ring is adhered to the mounting part, and the seal ring mounting part is close to one half of a height of the steel ball.

With the arrangement, in order to ensure the matching firmness of the seal ring and the copper head, the mounting part of the seal ring is processed so as to increase the contact area of an inner wall of the seal ring and the steel ball, and the contact area of the outer wall of the seal ring and the copper head, so that leakage of water can occur in the rolling process, the seal ring keeps stable and elastically recoverable, and the sealing can be ensured when the steel ball is not moved.

As a specific embodiment of the present invention, it may be preferable that, in the step S5, a durability test is carried out, a product is placed at a place for testing after is filled with water, is subjected to temperature difference change and time elapse, and a water-tight product is selected as a qualified product.

With the arrangement, in order to improve the reliability of the product, the quality pass rate of the product can be ensured after the durability test is carried out.

As a specific embodiment of the present invention, it may be preferable that, in the step S1, the groove-inlaying part is processed with internal threads, the ring-inlaying part is processed with external threads, and the groove-inlaying part is in threaded connection with the ring-inlaying part.

With the arrangement, in order to improve the connection firmness of the copper head and the steel pipe, threaded connection is adopted, and the firmness is improved.

As a specific embodiment of the present invention, it may be preferable that, after the step S4, the steel pipe is bent or a caliber of the steel pipe is necked.

With the arrangement, Necking caliber of the steel pipe is mainly used for keeping the steel ball in the steel pipe and preventing the steel ball from falling out.

In addition, the invention also provides a pet drinking bowl component, which comprises a steel pipe, a copper head inlayed at one end of the steel pipe, a seal ring arranged in the copper head, and a steel ball moving in the steel pipe and blocked by the seal ring, wherein the end of the steel pipe is provided with a groove-inlaying part. A ring-inlaying part is arranged at the end of the copper head, the groove-inlaying part and the ring-inlaying part are spliced through glue, a seal ring mounting part is further arranged on the copper head, an inner diameter of the seal ring mounting part is gradually reduced along the water outlet direction, and the outer wall of the seal ring is adhered to the mounting part. The seal ring mounting part is close to half the height of the steel ball.

With the arrangement, the cost for the material is obviously reduced, the structural strength is guaranteed by the inlayed copper head, and the copper head is not easy to deform even the pets bite it. The service life is guaranteed by the arrangement of the seal ring, the seal ring is arranged on the inner wall of the copper head, most of the seal ring and the copper head are exposed, the contact area is small, which is convenient for the pet to drink water. The steel ball is extruded by gravity thereof, the contact area of the steel ball is enlarged, so that sealing is guaranteed.

As a specific embodiment of the present invention, it may be preferable that, the end of the copper head is chamfered, a caliber of the inner wall of the copper head is gradually reduced along the water outlet direction, an inner diameter of the seal ring is reduced along the water outlet direction, a convex ring is further arranged at the outlet of the seal ring, the convex ring is staggered with a bottom of the seal ring, and the convex ring is in a hook shape.

According to the structure of the seal ring, the sealing performance of the steel ball and the seal ring is improved. As there is a convex ring where the seal ring and the steel ball are contacted, the convex ring is in a hook shape, the convex ring also abuts against the steel ball, the sealing performance is improved, and the convex ring is staggered with the bottom of the seal ring. When the steel ball rolls, a clearance is easily generated, water flows out, and it is convenient for the pets to drink water.

As a specific embodiment of the present invention, it may be preferable that, the seal ring is provided with an inner wall and an outer wall, the inner wall of the seal ring is adhered to the steel ball, the outer wall of the seal ring is adhered to the mounting part of the seal ring, the inner wall of the seal ring comprises a first arc segment and a second arc segment, the first arc segment is adhered to the steel ball, a gradient of the second arc segment is smaller than that of the first arc segment, and the outer wall of the seal ring is V-shaped.

With the arrangement, the sealing performance of the seal ring is further improved, when analyzed from the perspective of stress, the seal ring is easy to loosen with the inner wall of a copper pipe when the rolling friction force of the steel ball is received, and the copper head is designed to be V-shaped at the mounting part of the seal ring, so that the upper stress and the lower stress can be resisted, the stability of the seal ring is ensured. Due to the fact that the first arc segment is adhered to the steel ball and is close to the middle of the steel ball, the contact area is smaller at the same height, and the sealing performance is reduced. In addition, the second arc segment enables the steel ball to press down the seal ring by gravity, the lower the steel ball is pressed down, the smaller the opening of the seal ring is, and the sealing performance is improved.

As a specific embodiment of the present invention, it may be preferable that, nano-silver particles are added on the seal ring.

With the arrangement, disinfection and sterilization effects on the metal silver ions are achieved, the sterilization effect on the water body can be achieved in the process of contacting the seal ring with water, and the safety and health brought by drinking water for pets are improved.

As a specific embodiment of the present invention, it may be preferable that, a water inlet end of the steel pipe is connected with a bottle cap, the bottle cap comprises a connecting ring with threads, and the connecting ring is used for being matched with a bottle opening of the drinking bottle. An inner ring is arranged in the connecting ring, vertical reinforcing ribs are arranged on the inner wall of the inner ring, the inner ring is used for being inserted into the bottle opening of the drinking bottle, an insertion hole is arranged at a bottom of the inner ring, the insertion hole is used for being inserted with the steel pipe, and a stopper is arranged at an inlet of the insertion hole.

With the arrangement, the bottle cap and the water outlet pipe body are designed to be connected with each other, so that the water outlet of the pet drinking bowl cannot leak at the position of the bottle mouth. In addition, when the caliber of the steel pipe is not necked, the steel pipe can be blocked by the stopper, and the steel ball is prevented from falling out. In addition, the stopper can guide the water body.

In summary, the invention has the following beneficial effects.

1. The metal material is reduced in use, and the production cost is reduced.
2. The structural strength is stable and firm.
3. Long service life guaranteed by long-term sealing is achieved, and the sealing property can be changed in use.

DESCRIPTION OF THE EMBODIMENTS

The present invention will now be described in further detail with reference to the accompanying drawings.

Example 1

Figure 1:
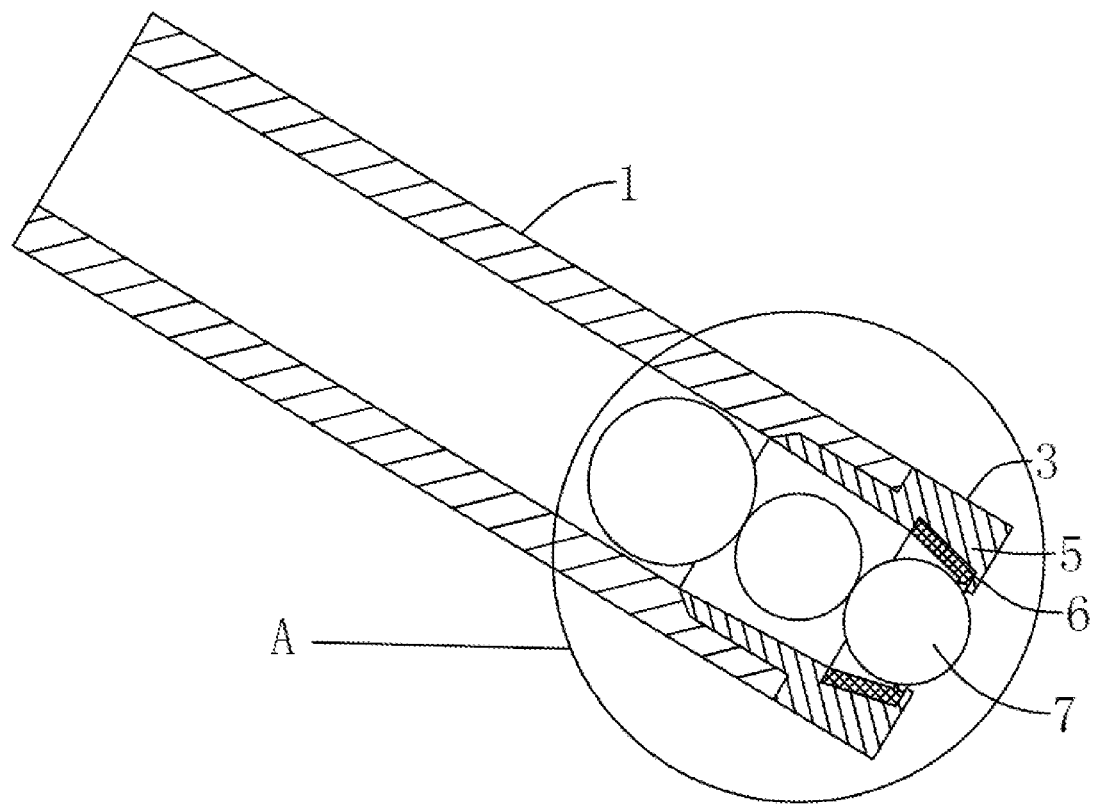
FIG. 1 is a schematic view showing a structure of a pet drinking bowl according to Example 1.

Shown in FIG. 1 is a pet drinking bowl component which comprises a steel pipe 1, a copper head 3 inlayed at one end of the steel pipe 1, a seal ring 6 arranged in the copper head 3, and a steel ball 7 movable in the steel pipe 1 and blocked by the seal ring 6. A seal ring mounting part 5 is arranged in a copper pipe 3, and a seal ring 6 is arranged on the seal ring mounting part 5.

Figure 2:
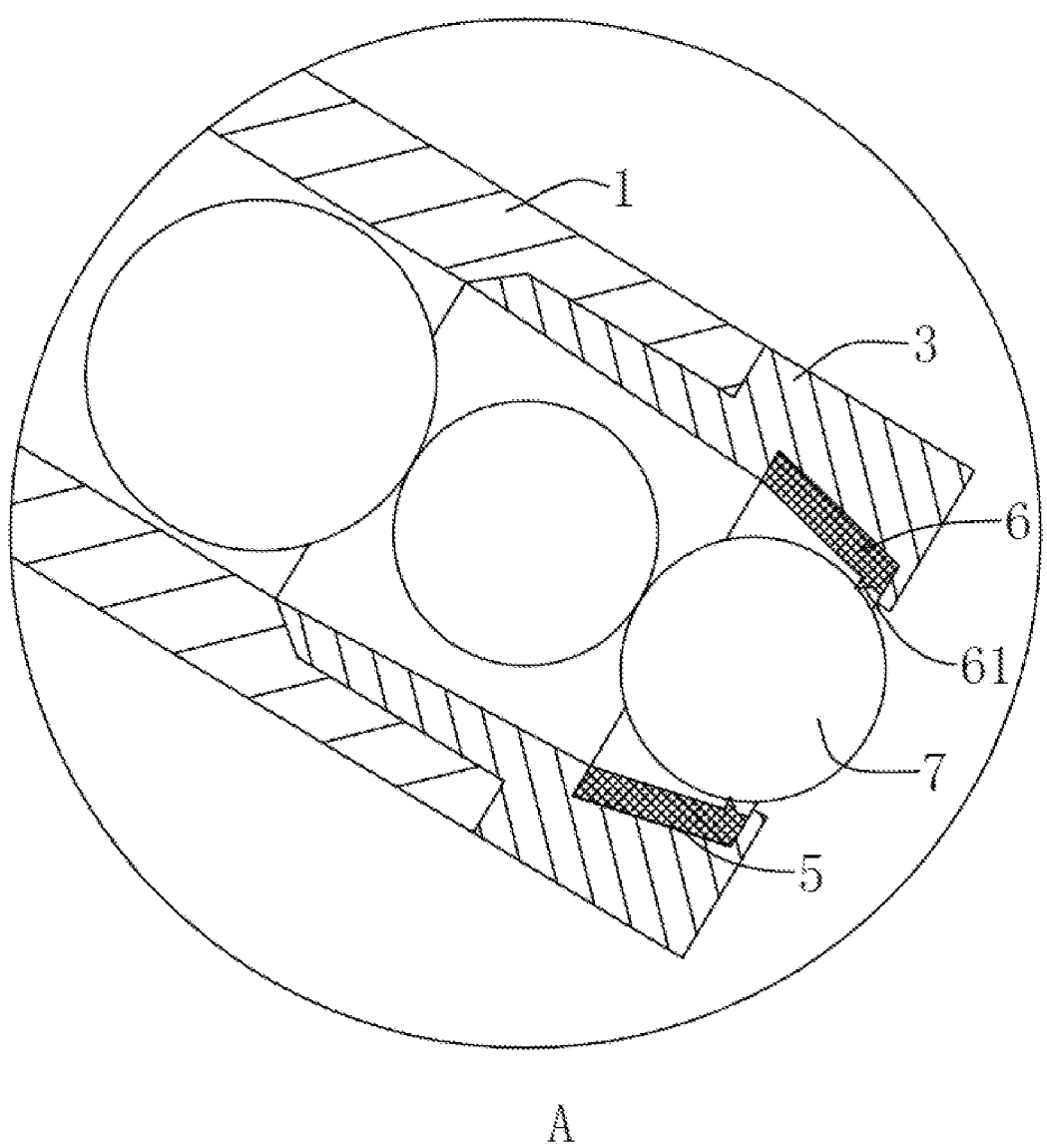
FIG. 2 is an enlarged view of portion A of FIG. 1.

Specifically, as shown in FIG. 2, an end of the copper head 3 is chamfered, a caliber of an inner wall of the copper head 3 is gradually reduced along a water outlet direction, an inner diameter of the seal ring 6 is reduced along the water outlet direction, and a convex ring 61 is further arranged at the outlet of the seal ring 6.

One small steel ball with a diameter of 6.35 mm and one large steel ball with a diameter of 7.93 mm are adopted, and a segment of the convex ring 61 is of a triangular hook-shaped structure, so that the small steel ball can abut against the convex ring 61 of the seal ring 6. A distance is reserved between the convex ring 61 and a bottom of the seal ring 6, and a dislocation design is adopted, so that an empty area is formed when the convex ring 61 is close to the bottom of the seal ring 6. Therefore, when a pet licks the small steel ball, a clearance is easier to be formed between the seal ring 6 and the small steel ball, and it is convenient for the pet to drink water. The deformation amount of the convex ring 61 is obviously larger than that of the seal ring 6, and the convex ring 61 protrudes out of an inner wall of the seal ring 6 and can be deformed by extrusion of the small steel ball.

In addition, the seal ring 6 can be designed so that a thickness of the seal ring 6 is increased along the water outlet direction, and the sealing performance of the steel ball 7 and the seal ring 6 is improved by adopting the structure of the seal ring 6. A position closer to the outlet is more elastic, so that the sealing performance is high, a contact area of the steel ball 7 is also enlarged, when the steel ball 7 rolls, clearances are easily generated, water flows out, and it is convenient for the pets to drink water.

Example 2

Figure 3:
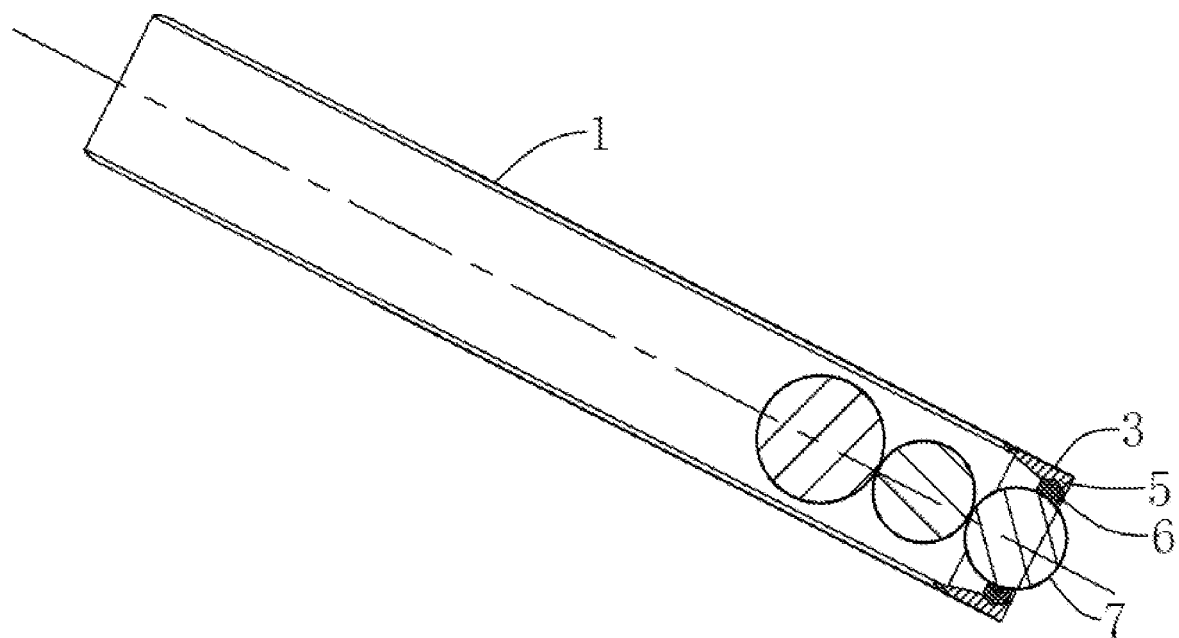
FIG. 3 is a structural diagram of a pet drinking bowl according to Example 2.
Figure 4:
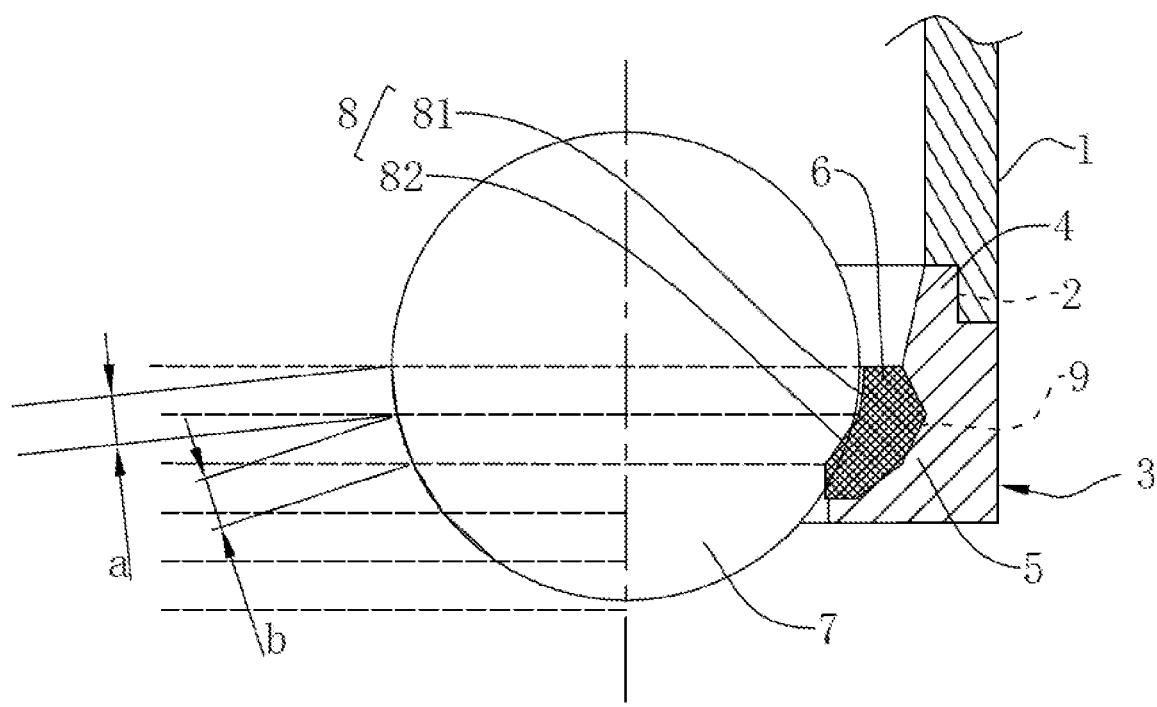
FIG. 4 is a structural diagram of a steel ball, a seal ring, a copper head and a steel pipe in the example.

As shown in FIG. 3 and FIG. 4, the end of the steel pipe 1 is provided with a groove-inlaying part 2, the end of the copper pipe 3 is provided with a ring-inlaying part 4, and the groove-inlaying part 2 and the ring-inlaying part 4 are spliced by glue. Alternatively, the groove-inlaying part 2 and the ring-inlaying part 4 may be threaded, and the internal and external threads are not shown in FIG. 4.

With regard to the seal ring mounting portion 5 in FIG. 4, which has a V-shaped groove structure, an outer wall 9 of the seal ring 6 is adhered to the mounting portion thereof, and the seal ring mounting portion 5 is close to half a height of the steel ball 7 itself.

The seal ring 6 is provided with an inner wall 8 and the outer wall 9, the inner wall 8 of the seal ring 6 is adhered to the steel ball 7, the outer wall 9 of the seal ring 6 is adhered to the seal ring mounting part 5, the inner wall 8 of the seal ring 6 comprises a first arc segment 81 and a second arc segment 82, the first arc segment 81 is adhered to the steel ball 7, a gradient of the second arc segment 82 is smaller than that of the first arc segment 81, and the outer wall 9 of the seal ring 6 is V-shaped. As shown in the left half of FIG. 4, in order to further illustrate its principle, it should be explained that for the same height, the bisector of FIG. 4 divides the circumference into several arcs, from which it can be concluded that an arc length on the circumference of segment a is smaller than that of segment b, and the arc length gradually increases as the distance from the center of the circle increases. The steel ball 7 thus has multiple sealing effects during use.

Example 3

Based on Example 1, nano-silver particles may be added to the seal ring 6, which exerts disinfection and sterilization effects on metal silver ions, as well as sterilization effect on the water body in the process of contacting the seal ring 6 with water, and the safety and health brought by drinking water for pets are improved.

Example 4

Figure 5:
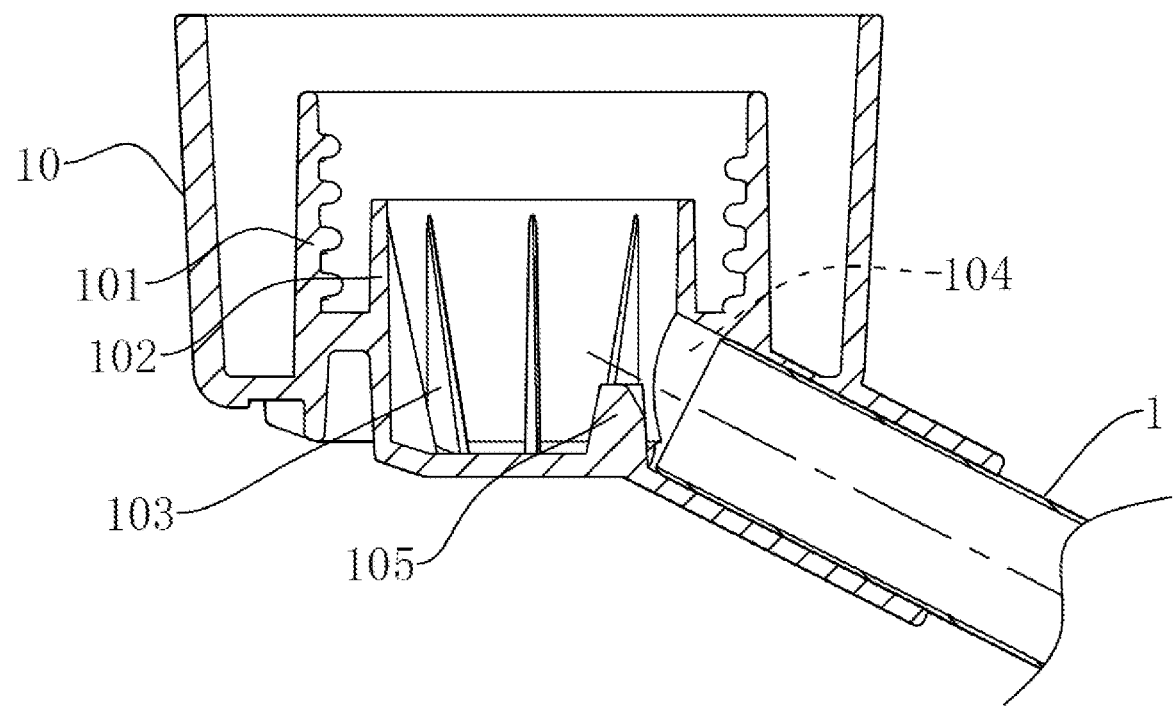
FIG. 5 is a segmental view showing the structure of the bottle cap of the pet drinking bowl according to the example.
Figure 6:
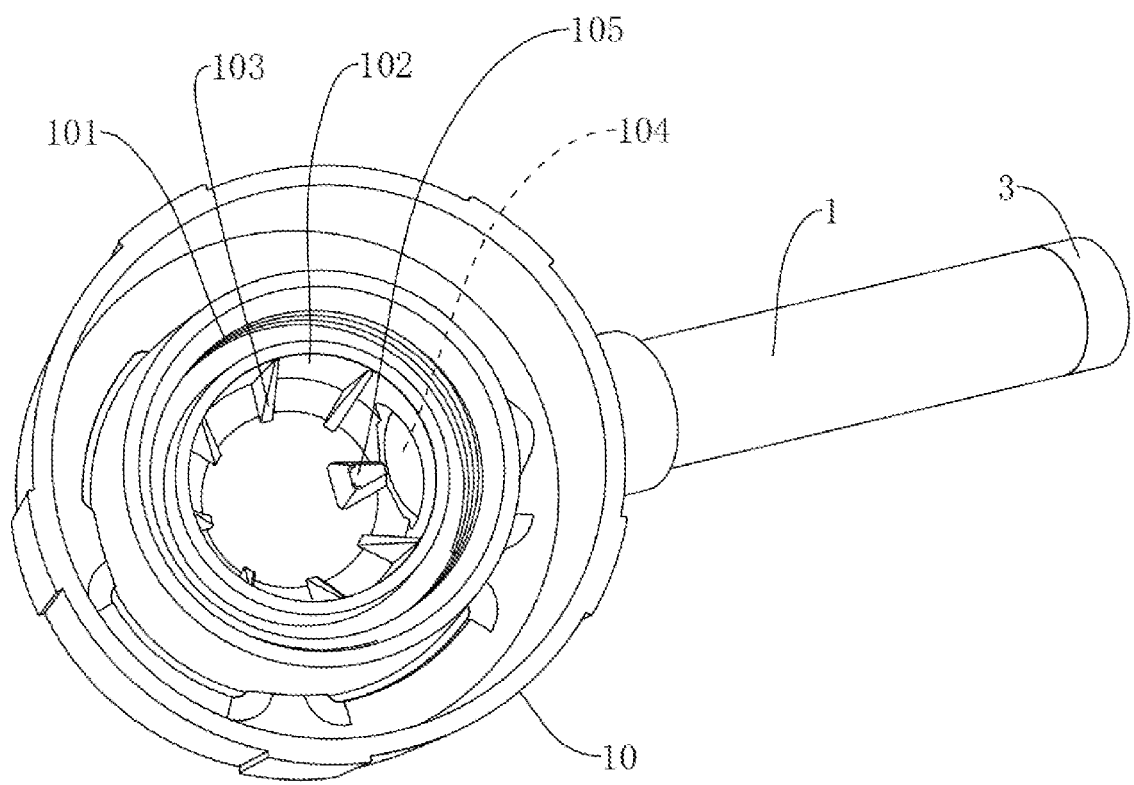
FIG. 6 is a structural diagram of the bottle cap according to the example.

On the basis of the Example 1, as shown in FIG. 5 and FIG. 6, a water inlet end of the steel pipe 1 is connected with a bottle cap 10, the bottle cap 10 comprises a connecting ring 101 with threads, and the connecting ring 101 is used for being matched with a bottle opening of a drinking bottle. An inner ring 102 is arranged in the connecting ring 101, vertical reinforcing ribs 103 are arranged on an inner wall of the inner ring 102, the inner ring 102 is used for being inserted into the bottle opening of the drinking bottle, an insertion hole 104 is arranged at a bottom of the inner ring 102, the insertion hole 104 is used for being inserted with the steel pipe 1, and a stopper 105 is arranged at an inlet of the insertion hole 104. The bottle cap 10 and a water outlet pipe body are designed to be connected with each other, so that the water outlet of the pet drinking bowl cannot leak at the position of the bottle mouth. In addition, when a caliber of the steel pipe 1 is not necked, the steel pipe can be blocked by the stopper 105, and the steel ball 7 is prevented from falling out. Wrapping means that the end of the steel pipe 1 is subjected to necking treatment, and the steel ball 7 is not easy to fall out when a caliber of a port is reduced.

The method of processing the product comprises the following steps.

S1, cutting off a steel pipe 1, machining an end face of each segment of the steel pipe 1 by using a lathe to keep smoothness, machining one end of the steel pipe 1 by using the lathe to form a groove-inlaying part 2, cutting off a copper head 3, machining one end of the copper head 3 by using the lathe to form a ring-inlaying part 4, and machining the inner wall of the copper head 3 to form a seal ring mounting part 5, machining the seal ring mounting part 5, gradually reducing an inner diameter of the seal ring mounting part 5 along the water outlet direction, and chamfering the other end of the copper head 3. The outer wall 9 of the seal ring 6 is adhered to the mounting part thereof, and the seal ring mounting part 5 is close to half the height of the steel ball 7.

S2, coating glue on the groove-inlaying part 2 or the ring-inlaying part 4, splicing the groove-inlaying part 2 and the ring-inlaying part 4, pressing by a press machine, and cooling to form the water outlet pipe body.

S3, electroplating the water outlet pipe body.

S4, mounting a seal ring 6 on the inner wall of the copper head 3 by using a clamp, and throwing a steel ball 7 into the end of the steel pipe 1.

S5, carrying out a durability test, placing the product at a place for testing after being filled with water, subjecting it to temperature difference change and time elapse, and selecting a water-tight product as a qualified product which is the water outlet pipe body.

This step may or may not be added in step S1. The groove-inlaying part 2 is manufactured with internal threads, the ring-inlaying part 4 is manufactured with external threads, and the groove-inlaying part 2 is in threaded connection with the ring-inlaying part 4.

This step may or may not be added in step S4. After step S4, the steel pipe 1 is bent or the caliber of the steel pipe 1 is necked. Necking caliber of the steel pipe is mainly used for keeping the steel ball 7 in the steel pipe 1 and preventing the steel ball 7 from falling out. Necking caliber means necking the caliber of the steel pipe 1.

Usage

According to the technical scheme, a plurality of steel balls 7 are arranged in the steel pipe 1, when the pet cage support and the like are vibrated, due to the fact that a water outlet pipe extends obliquely downwards, the plurality of steel balls 7 in the water outlet pipe vibrate slightly due to gravity. The steel balls 7 at the pipe opening are not easily separated from the seal ring 6 at the pipe opening of the water outlet pipe, and water in the drinking bottle cannot be leaked mistakenly. There are three steel balls 7, the diameter of the steel balls 7 contacted with the stoppers 105 is large, and the diameter of the steel balls 7 contacted with the water outlet pipe body is small. The clearance between the large steel ball 7 and the inner wall of the water outlet pipe body is small, when the drinking bowl vibrates, the large steel ball 7 is pressed against the small steel ball 7 below by gravity, mistaken leakage is not easy to occur, the small steel ball 7 is arranged at the pipe opening of the water outlet pipe, the tongue pushes the three steel balls 7 to move upwards along the water outlet pipe when the pet is licking, and liquid flows to the lower end of the water outlet pipe through the small clearance between the large steel ball 7 and the inner wall of the water outlet pipe body. After the tongue is separated from the steel ball 7, the steel ball 7 rapidly moves downwards due to gravity, so that the large steel ball 7 has a strong pushing effect on water, the liquid can rapidly flow out of the water outlet pipe, the large steel ball 7 has a piston pushing effect on the water when the water outlet pipe is moving, the water flow is increased, and the pet can drink water conveniently.

It can be seen from FIG. 4 that a steel pipe 1 is adopted to ensure that the wall thickness of the water outlet pipe body is thin, materials are saved, and the smoothness of an inner wall of the steel pipe 1 is high. In addition, in order to ensure the structural strength of the end, a copper pipe 3 is adopted for inlaying, and a groove-inlaying part 2 and a ring-inlaying part 4 are formed by processing two parts through an inlaying technology of a copper head 3. At the moment, the water outlet pipe body is formed by splicing with glue and interference fit, then the water outlet pipe body is electroplated to improve the corrosion resistance and the surface smoothness of the water outlet pipe body, and then the seal ring 6 is placed to be inlayed on the mounting part of the seal ring 6. The size and gravity of the steel ball 7 ensure that the steel ball 7 can press the seal ring 6 to seal when the water storage amount of the drinking bottle is small. The seal ring 6 is deformed by the gravity of the steel ball 7 so as to be more adhered to the surface of the steel ball 7 to play a sealing role. In addition, when the pet licks the steel ball 7 with its tongue, the steel ball 7 is rolled, so that clearances are formed between the surfaces of the seal ring 6 and the steel ball 7, and water leakage can be achieved. The cost for the material is obviously reduced, the structural strength is guaranteed by the inlayed copper head 3, and the copper head 3 is not easy to deform even the pet bites it. The sealing reliability is achieved by the arrangement position of the seal ring 6, the seal ring 6 is arranged on the inner wall of the copper head 3, the seal ring 6 and the copper head 3 are partially exposed by the steel ball 7, the seal ring 6 is extruded by the steel ball 7 due to gravity, so that the contact area of the seal ring 6 is enlarged, and the sealing effect is improved by gravity. However, when the steel ball 7 rolls, gravity is reduced, the elasticity and the contact area of the seal ring 6 are smaller, so that the sealing effect is reduced, and drinking water is easier. The steel ball 7 can leak water in the rolling process, the seal ring 6 keeps stable and elastically recoverable, and the sealing can be ensured when the steel ball 7 is not moved.

This example is merely illustrative of the invention and is not intended to be limiting of the invention, as modifications of the examples may suggest themselves to persons skilled in the art having the benefit of this disclosure without departing from the scope of the invention as defined in the appended claims.

What is claimed is:

1. A pet drinking bowl component, comprising a steel pipe, a copper head inlayed at one end of the steel pipe, a seal ring arranged in the copper head, and a steel ball moving in the steel pipe and blocked by the seal ring, wherein the end of the steel pipe is provided with a groove-inlaying part; a ring-inlaying part is arranged at an end of the copper head, the groove-inlaying part and the ring-inlaying part are spliced through glue, a seal ring mounting part is further arranged on the copper head, an inner diameter of the seal ring mounting part is gradually reduced along a water outlet direction, and an outer wall of the seal ring is adhered to the seal ring mounting part; the seal ring mounting part is close to half a height of the steel ball, the end of the copper head being chamfered, a caliber of an inner wall of the copper head being gradually reduced along the water outlet direction, an inner diameter of the seal ring being reduced along the water outlet direction, a convex ring staggered with a bottom of the seal ring and in a hook shape being further arranged at an outlet of the seal ring.

2. The pet drinking bowl component according to claim 1, wherein the seal ring being provided with an inner wall and the outer wall, wherein the inner wall of the seal ring is adhered to the steel ball, the outer wall of the seal ring is adhered to the seal ring mounting part, and the inner wall of the seal ring comprises a first arc segment and a second arc segment; the first arc segment is attached with the steel ball, a slope of the second arc segment is smaller than that of the first arc segment, and the outer wall of the seal ring is V-shaped.

3. The pet drinking bowl component according to claim 1, wherein nano-silver particles being added on the seal ring.

4. The pet drinking bowl component according to claim 1, wherein a water inlet end of the steel pipe being connected with a bottle cap, wherein the bottle cap comprises a connecting ring with threads, the connecting ring is used for being matched with a bottle opening of a drinking bottle, an inner ring is arranged in the connecting ring, vertical reinforcing ribs are arranged on an inner wall of the inner ring, and the inner ring is used for being inserted into the bottle opening of the drinking bottle; an insertion hole is arranged at a bottom of the inner ring, the insertion hole is used for being inserted with the steel pipe, and a stopper is arranged at an inlet of the insertion hole.

\* \* \* \* \*

UNITED STATES PATENT AND TRADEMARK OFFICE
CERTIFICATE OF CORRECTION

| | | |
|---|---|---|
| PATENT NO. | : 11,154,035 B2 | Page 1 of 1 |
| APPLICATION NO. | : 16/663326 | |
| DATED | : October 26, 2021 | |
| INVENTOR(S) | : Bin Cai | |

It is certified that error appears in the above-identified patent and that said Letters Patent is hereby corrected as shown below:

On the Title Page

Item (71) Applicant should read:
Taizhou Huangyan Pianpian Pet Products Factory (General Partnership), Zhejiang (CN)

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*